Jan. 16, 1951 S. MAURER 2,538,115
DEVICE FOR CANNING
Filed Sept. 19, 1946
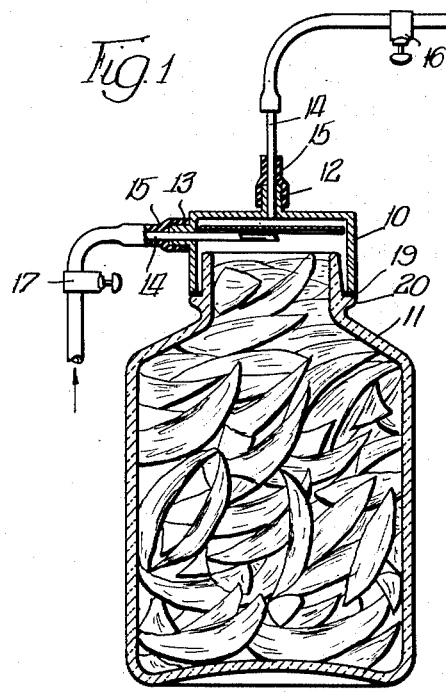
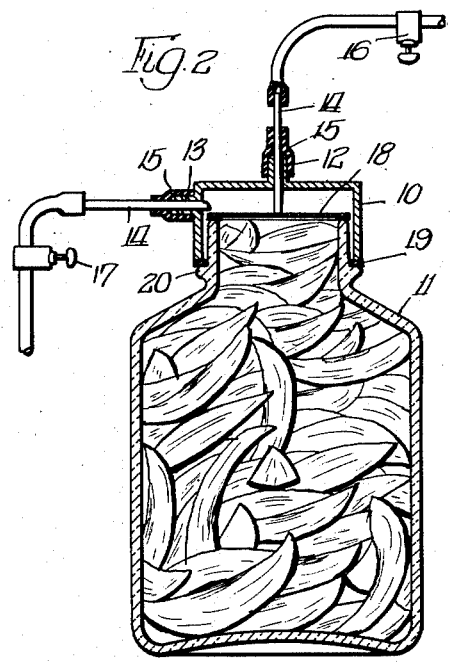
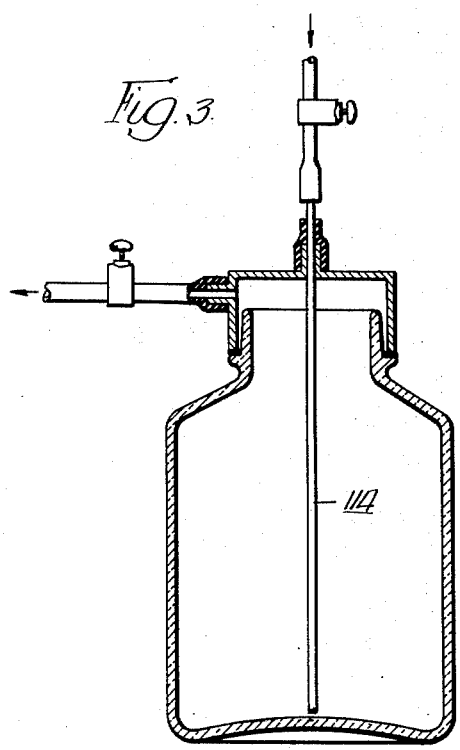
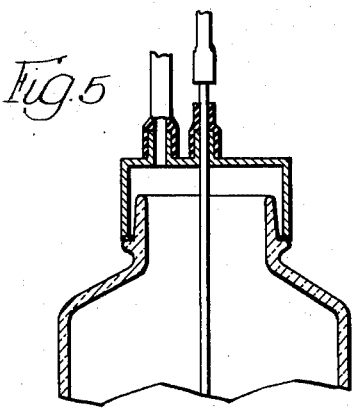
INVENTOR.
Siegfried Maurer,
BY
Cromwell, Greist & Warden
ATTYS.

Patented Jan. 16, 1951

2,538,115

UNITED STATES PATENT OFFICE 2,538,115

DEVICE FOR CANNING

Siegfried Maurer, Chicago, Ill.

Application September 19, 1946, Serial No. 697,991

7 Claims. (Cl. 226—82)

This invention relates to the home canning of foods. More particularly, it pertains to a device adapted to fit over the mouth and around the neck of a conventional type canning jar to exhaust air and other gases therefrom, and from the food packed therein, in order to preserve the vitamins in the food during processing and to maintain the vitamins therein after the food has been processed and the container sealed.

Heretofore, the primary reason for the preservation of food was to sterilize it and keep it in a sterilized condition. Today, with the newer knowledge of nutrition, not only is it necessary to render and keep the food bacteria-free, but it is of primary importance that most of the vitamins and minerals in the ultimately processed foods be saved.

It is known that vitamins are highly active compounds which are very susceptible to oxidation. They oxidize at a slow rate at room temperature, increase slowly in rate of oxidation with a rise in temperature, and oxidize at a rapid rate in temperatures such as those reached in conventional sterilizing processes. The vitamins are destroyed by oxidation in a few minutes at boiling temperature. At pasteurization temperature they are destroyed at a slower rate just as certain bacteria are destroyed at a slower rate by pasteurization than by higher temperature sterilization. Vitamins withstand these temperatures quite well in the absence of oxygen. In home canning of foods, most of the vitamins are destroyed by heat and oxidation because the canning methods and equipment utilized for the purpose do not contemplate nor provide means for the removal of oxygen from the can, or container, prior to the sterilization process.

Briefly, there are several methods employed in home canning of food in glass jars; the open kettle and the cold pack are two common methods. With the open kettle method, food is cooked and sterilized by boiling in an open kettle and then packed into sterile jars and sealed by closing with a sterile lid. This method destroys practically all of the vitamins present in the food. The cold pack method includes the placing of the food into clean jars and sealing them. The cold sealed jar is sterilized by one of three methods: (1) pasteurization; (2) boiling water bath; (3) pressure cooker. Any of these three processes will preserve the food but most of the vitamins are destroyed because oxygen is left in the can upon sealing and the loss of vitamins occurs because of their oxidation. Oxygen and other gases may be expelled through the seal by the increased pressure produced by the expansion of the gases within the heated container. The vitamins are destroyed during the heating. Sometimes, when using the process of pressure cooking, these gases are not expelled through the tightened seal until the pressure is reduced outside the container. In that case the juice in the jar boils out, leaving the contents of the jar above the fluid level. Loss of juice may occur in the water bath process during boiling for the same reason.

A serious objection to the pressure cooking process for sterilizing glass jars is the loss of time involved while waiting for the cooker to cool. If the presure is blown down as soon as the sterilization process is complete, there is danger of the jars exploding due to the increased pressure within the jar produced by failure of the heat-expanded gas to escape.

It would be a distinct advantage to overcome the foregoing as well as other difficulties attendant upon such processes and this is accomplished by means of the present invention.

Generally, therefore, it is an object of the present invention to provide a household device which will be simple, yet durable of construction, economic of manufacture, and easy to operate in evacuating gases from conventional types of canning jars, and the contents of the food packed therein, thereby preserving the vitamin content of such foods during and after processing.

More specifically, it is an object of the invention to provide a household vacuum sealing device for use in canning and processing foods wherein a dome is utilized which is adapted to fit over the mouth and neck portion of a conventional type container, the dome having a plurality of members communicating with the inside thereof, one of the members being adapted to be connected to a vacuum supply to exhaust the container as well as the food contents of any gases accumulated therein, and in which the other member is adapted to be connected to a liquid supply source which is compatible with the food packed in the container in order to fill the evacuated container therewith.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing in which:

Fig. 1 is a vertical sectional view of a household vacuum sealing device embodying the present invention placed in position on a glass jar, illustrating an initial step in the operation of the device;

Fig. 2 is a view similar to Fig. 1 illustrating a second step in the operation of the device;

Fig. 3 is a view similar to Fig. 1 showing a modified form of the invention in which the liquid filling tube extends to the bottom of the container depicting an initial step in the operation of the device;

Fig. 4 is a fragmentary view, partly in section, of the top of the arrangement shown in Fig. 3 showing a second step in the operation of the device; and Fig. 5 is a transverse sectional view of a still further modification of the device mounted in position on a top portion of a glass jar depicting the liquid and vacuum arrangement both located in the top of the device.

Referring now more particularly to the drawing, it will be seen that the device consists of a dome 10 adapted to fit over the mouth and neck portion of a conventional type of container 11. The dome has at least two members 12 and 13 which communicate with the inside of the dome. Preferably, these are tubular and may be integral with the dome. One member 12 is in the top of the dome and the other member 13 is at one side thereof. The member 12 is adapted to be connected to a vacuum supply to exhaust the container and food contents of accumulated gases. The other member 13 is adapted to be connected to a liquid supply source for filling the evacuated container therewith.

In order more easily to connect the members 12 and 13 to their respective vacuum and liquid supply sources a tube 14 of any suitable material may slidably be mounted in each of the tubular members 12 and 13. Each tube 14, where it enters the tubular members 12 and 13, is provided with a self-sealing fitting 15 through which the slidably mounted tubes are sealably connected.

The tube in the member 12 is connected in any suitable manner to a vacuum supply source and is controlled by a valve 16. The tube in the member 13 is connected in any suitable manner to a liquid supply source which is controlled by a valve 17.

In operation, the food commodity, after it has been prepared and washed in water of about 110° to 115° F., is placed in the jar 11. Thereafter the dome, or bell, 10 is placed over the top of the jar. If a jar, such as that depicted in the drawing which is known as a Kerr type jar and which utilizes a plate or cover 18 having a rubber gasket thereunder, is used the plate or cover is positioned so that it comes to rest on top of the tube 14 as depicted in Fig. 1. The dome 10 is connected to a vacuum pump and air and other gases including carbon dioxide are then evacuated from the jar and its contents. The evacuation is accelerated by boiling of the water remaining in the warmed material in the jar at the reduced pressure obtained by the vacuum pump. After all the air, or gas, has been evacuated and nothing except water vapor comes off the warmed material in the jar, a liquid which is compatible with the food commodity being processed is admitted under vacuum until the food commodity is covered. While still under vacuum the lid or cover 18 is lowered into place on the top of the mouth of the jar by withdrawing the slidably mounted tubular member 14 a sufficient distance through the member 13 and sealing fitting 15 so that the lid 18 can bypass the same whereupon it will be held firmly in position against the top of the jar. The vacuum in the dome is reduced to atmospheric pressure by admitting air or the same fluid that was admitted to the jar in the space above the lid. The vacuum sealer or dome 10 is then removed, leaving the jar sealed by atmospheric pressure. Next, a conventional jar lid (not shown) is clamped onto the sealed jar by screwing the band firmly over the top of the lid and neck of the jar. This band seals the jar to withstand pressure from within when the jar and its contents are subjected to heat sterilization and after removing the same from the cooker used for that purpose.

Attention is called to the fact that at this point such vacuum sealing before sterilizing or cooking enables one to remove the jar from the pressure cooker after quickly blowing down the pressure in the cooker immediately after sterilization is complete. The pressure in the jar is only equal to or less than that of the cooker. The firmly clamped vacuum sealed lid easily holds this pressure without danger of explosion which, as above indicated, is not uncommon when the pressure is suddenly reduced on jars which have been sealed cold at atmospheric pressure. Furthermore, the liquid, or juice, placed in the jar does not leak out of it as is often the case when the sealing is done in the conventional manner.

In order to aid in the sealing operation a rubber gasket 19 should be used in order to permit the dome, which may be of metal, glass, or plastic, to seat against the conventional shoulder 20 of the glass jar.

The tubes 14, 14, may be made of metal or any other suitable material.

It should be understood that a single tube could be used for evacuating the jar as well as for filling the same with liquid. However, it is more convenient to employ a side tube for one operation and a top tube for another operation because of the increased speed of operations, and also because of the fact that the side tube enables an operator to hold the plate 18 in an out of the way position.

As above indicated, the vacuum can be broken by admitting fluid over the top of the lid until the pressure on the lid is equal to that of the atmosphere. The dome easily can be removed with the jar in upside down position. The fluid in the dome can be recovered by pouring it into a suitable container.

The foregoing method of sealing when the jar lid is held in the top of the dome is best applied to materials which do not foam. Fragments of vegetables, fruit or meat which foam may be displaced so that they rest on the sealing edge of the jar. When the lid is dropped into place the fragment will be caught between the sealing edge and the lid. In most cases the pressure on the lid will make an apparently good seal, but in time molds or air may penetrate through the compressed food fragment and produce spoilage of the contents of the jar. With food that foams, it is best to remove the dome after thoroughly evacuating all atmospheric oxygen from the jar and covering its contents with liquid. The sealing edge of the jar should then be wiped clean and a clean lid placed upon it. The dome should then be replaced on the top of the jar and the lid held firmly in place by pressing down on it with the tubing on top of the dome through which the vacuum is pumped. While holding the lid of the jar firmly in place, the vacuum should be turned into the dome and the air in the jar pumped from under the lid. The lid will act as a check valve by being held against the sealing edge firmly enough to keep foam-carried fragments from the sealing surfaces, but loosely enough to permit complete evacuation of atmospheric oxygen.

Referring now to Figs. 3 and 4 it will be seen that they depict a modified form of the invention only in that a longer liquid tube 114 is utilized which reaches to the bottom of the jar so that liquid can be filled from the bottom thereof while a vacuum is being maintained. In this respect the device further differs from what is disclosed in Fig. 1 in that the liquid is admitted from the top of the dome whereas the vacuum is connected with a vacuum pump through the side of the dome. Otherwise, the fittings are in all other respects similar to what is shown in Figs. 1 and 2.

Fig. 3 further depicts the position of the parts when pumping air and other gases from the contents of the jar and for filling liquid into the jar from the bottom while the vacuum is maintained. Fig. 4 illustrates the position of the parts for vacuum sealing of the jar after filling of the jar with liquid with the contents still under vacuum. In this case the vacuum sealer, or dome, has already been removed, the top of the jar cleaned and the cleaned lid placed on top of the jar before placing the dome, or vacuum sealer, back in position. In this operation the liquid filling tube is withdrawn sufficiently in order to hold the lid 118 in place.

In Fig. 5 there is shown a further modification of the invention. In this embodiment both the means for pumping air and other gases from the contents of the jar and means for filling liquid into the jar from the bottom while the vacuum is maintained are placed in the top of the dome. This also illustrates the position of parts for pumping the air and other gases from the contents of the jar and for filling liquid into the jar from the bottom while the vacuum is maintained. This operation is concluded after filling the jar with liquid. For vacuum sealing this jar the dome will also have been removed after the liquid filling operation. The top of the jar is then cleaned around the sealing edge and a clean jar lid is placed on it. The dome is once again placed over the top of the jar and the jar lid is held in place by down pressure on the tube used for filling the jar with liquid. This last operation is not depicted in the drawing because of the fact that both vacuum and liquid means are on top of the dome and the final operation is the same as that described above.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A household vacuum sealing device for use in canning and processing foods, which comprises a dome adapted to fit over and downwardly around the mouth and neck portion of a conventional type of container, said dome having a plurality of members slidably communicating with the inside thereof, one of said members being adapted to be connected to a vacuum supply to evacuate the container and food contents of accumulated gases, and the other of said members being adapted to be connected to a liquid supply source which is compatible with said food for filling the evacuated container therewith while said vacuum is being maintained.

2. A household vacuum sealing device for use in canning and processing foods, which comprises a dome adapted to fit over and downwardly around the mouth and neck portion of a conventional type of container, said dome having a plurality of members communicating with the inside thereof, each of said members having a tube slidably mounted therein, one of said tubes being adapted to be connected to a vacuum supply to evacuate the container and food contents of accumulated gases, and the other of said tubes being adapted to be connected to a liquid supply source which is compatible with said food for filling the evacuated container therewith while said vacuum is being maintained.

3. A household vacuum sealing device for use in canning and processing foods, which comprises a dome adapted to fit over and downwardly around the mouth and neck portion of a conventional type of container, said dome having a plurality of members communicating with the inside thereof, each of said members having a tube slidably mounted therein, one of said tubes being adapted to be connected to a vacuum supply to evacuate the container and food contents of accumulated gases, the other of said tubes being adapted to be connected to a liquid supply source which is compatible with said food for filling the evacuated container therewith while said vacuum is being maintained, and each of said first named members being provided with a self-sealing fitting through which said slidably mounted tubes are sealably connected.

4. A home vacuum sealing device as defined by claim 1, and wherein one of said members is disposed at the top of said dome, and the other of said members is disposed at the side thereof.

5. A home vacuum sealing device as defined by claim 1, and wherein both of said members are disposed at the top of said dome.

6. A vacuum sealing device adapted for use in canning and processing foods, which comprises a dome adapted to be attached to and close the mouth of a conventional type container, a pair of connections on said dome communicating with the interior thereof with at least one of said connections being on the top of said dome, and a tubular member slidably fitting in airtight relationship within said top connection so that the bottom end of said tubular member may be raised and lowered within said dome.

7. A vacuum sealing device adapted for use in canning and processing foods which comprises a dome adapted to be attached to and close the mouth of a conventional type container, a pair of connections on said dome communicating with the interior thereof with at least one of said connections projecting laterally on the side of said dome, and a tubular member slidably fitting in airtight relationship within said lateral connection so that the tubular member may be inserted in and withdrawn from the interior of said dome.

SIEGFRIED MAURER.

REFERENCES CITED

The following references are of record in the file of this patent:

UNITED STATES PATENTS

| Number | Name | Date |
|---|---|---|
| 982,860 | Peelle | Jan. 31, 1911 |
| 1,141,271 | Schloemer et al. | June 1, 1915 |
| 1,437,917 | Shelor | Dec. 5, 1922 |
| 2,073,339 | Eberts | Nov. 9, 1937 |
| 2,436,849 | Billetter | Mar. 2, 1948 |

FOREIGN PATENTS

| Number | Country | Date |
|---|---|---|
| 301,568 | Italy | Oct. 6, 1932 |